: US010153625B2

United States Patent
Lee et al.

(10) Patent No.: US 10,153,625 B2
(45) Date of Patent: Dec. 11, 2018

(54) INTERLOCK DEVICE FOR PREVENTING CLOSE DURING INSERTION OR WITHDRAW ON CIRCUIT BREAKER IN SWITCH BOARD

(71) Applicant: LSIS CO., LTD., Gyeonggi-do (KR)

(72) Inventors: Han-Joo Lee, Gyeonggi-do (KR); Kil-Young Ahn, Gyeonggi-do (KR); Hong-Ik Yang, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/634,923

(22) Filed: Jun. 27, 2017

(65) Prior Publication Data

US 2018/0090917 A1   Mar. 29, 2018

(30) Foreign Application Priority Data

Sep. 28, 2016   (KR) .......................... 10-2016-0125119

(51) Int. Cl.
*H02B 11/133* (2006.01)
*H02B 11/167* (2006.01)
*H01H 33/46* (2006.01)
*H01H 33/66* (2006.01)

(52) U.S. Cl.
CPC .......... *H02B 11/133* (2013.01); *H01H 33/46* (2013.01); *H02B 11/167* (2013.01); *H01H 33/66* (2013.01)

(58) Field of Classification Search
CPC .......................... H02B 11/133; H02B 11/167
USPC ................... 200/50.21–50.27; 361/607, 609
See application file for complete search history.

(56) References Cited

U.S. PATENT DOCUMENTS 3,288,956 A * 11/1966 Jencks .................. H01H 9/10
200/50.23
4,412,112 A    10/1983 Ishikawa et al.

FOREIGN PATENT DOCUMENTS

| CN | 202454950 U | 9/2012 |
| EP | 0308868 A2 | 3/1989 |
| EP | 2267852 A2 | 12/2010 |
| EP | 3026765 A1 | 6/2016 |
| KR | 10-0972935 B1 | 7/2010 |
| KR | 10-1106899 B1 | 1/2012 |

(Continued)

OTHER PUBLICATIONS

European Search Report for related European Application No. 17173343.9; report dated Jan. 5, 2018; (6 pages).

*Primary Examiner* — Edwin A. Leon
*Assistant Examiner* — Lheiren Mae A Caroc
(74) *Attorney, Agent, or Firm* — K&L Gates LLP

(57) ABSTRACT

The present disclosure relates an interlock device for preventing insertion or withdrawal of a circuit breaker into or from a switch board having an ON button and an OFF button and including a switch board body provided with a housing and a rail having an interruption hole formed on one side surface thereof, a carriage movable back and forth along the rail of the switch board body, and the circuit breaker including a main body installed on the carriage and inserted into or withdrawn from the switch board body, the interlock device comprising an interlock rod protruding toward one side to set or release a pressed state, wherein the interlock rod is set in or released from the pressed state and inserted into or disengaged from the interruption hole when the main body is put in or tripped.

4 Claims, 5 Drawing Sheets

(56) References Cited

FOREIGN PATENT DOCUMENTS

KR    10-1148797  B1    5/2012

\* cited by examiner

INTERLOCK DEVICE FOR PREVENTING CLOSE DURING INSERTION OR WITHDRAW ON CIRCUIT BREAKER IN SWITCH BOARD

CROSS-REFERENCE TO RELATED APPLICATIONS

This application claims the priority of Korean Patent Application No. 10-2016-0125119 filed on Sep. 28, 2016, in the Korean Intellectual Property Office, the disclosure of which is hereby incorporated by reference in its entirety.

BACKGROUND

1. Technical Field

The present disclosure relates to an interlock device for preventing insertion or withdrawal of a circuit breaker in a switch board, which is capable of preventing the circuit breaker from being withdrawn from or inserted into the switch board after the circuit breaker is put into the circuit breaker.

2. Description of the Related Art

Generally, a vacuum circuit breaker is built in the switchboard and is capable of cutting off a fault current on the line and allowing a rated current to be applied. The vacuum circuit breaker is a device that quickly isolates a circuit by extinguishing, in a vacuum container, an arc generated in the event of opening/closing of a normal load and interruption of a fault current.

Vacuum circuit breakers may be divided into a fixed vacuum circuit breaker consisting of only a breaker body and fixedly installed on a switch board panel, and a withdrawable vacuum circuit breaker provided with a cabinet called a cradle for easy maintenance such that the breaker body can be inserted into/withdrawn from the cradle.

For the fixed circuit breaker, the terminals fixed to the power source side and the load side need to be disconnected to perform maintenance, which increases work time and maintenance time. For this reason, the withdrawable vacuum circuit breaker, which can be separated from the cradle for the maintenance operation, is mainly used.

If insertion or withdrawal of the withdrawable circuit breaker is attempted after the circuit breaker is put into the switch board (ON state), an arc is generated by incomplete contact as soon as a contactor installed on the vacuum circuit breaker contacts a terminal connected to a power supply bus of the switch board.

Therefore, there is a need for an interlock device for preventing insertion or withdrawal of a vacuum circuit breaker after the circuit breaker is put in.

PRIOR ART DOCUMENT

Patent Literature (Patent Document 1) Korean Patent Application Publication No. 10-2016-0064806 (Pub. Date: Jun. 8, 2016)

SUMMARY

It is an object of the present disclosure to provide an interlock device for preventing insertion or withdrawal of a circuit breaker which is structurally improved to prevent the circuit breaker put into the switch board from being withdrawn from or inserted into the switch board to prevent an accident caused by incomplete contact between the switch board and the circuit breaker.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, an interlock device for preventing insertion or withdrawal of a circuit breaker into or from a switch board having an ON button and an OFF button and including a switch board body provided with a housing and a rail having an interruption hole formed on one side surface thereof, a carriage movable back and forth along the rail of the switch board body, and the circuit breaker including a main body installed on the carriage and inserted into or withdrawn from the switch board body includes an interlock rod protruding toward one side to set or release a pressed state, wherein the interlock rod is set in or released from the pressed state and inserted into or disengaged from the interruption hole when the main body is put in or tripped.

According to the present disclosure, a circuit breaker includes an insertion/withdrawal interlock device inserted into an interruption hole in the switch board, and thus the circuit breaker cannot be removed from the switch board while power is applied. Accordingly, an accident caused by incomplete contact between the power source of the switch board and the terminal of the circuit breaker may be prevented, and the circuit breaker may be prevented from being broken due to electrical damages.

In addition, when the circuit breaker is inserted into the switch board, the OFF button is kept pressed by the insertion/withdrawal interlock device, and therefore power is not applied even if the ON button for putting in the circuit breaker is inadvertently pressed during insertion of the circuit breaker. Therefore, stability may be enhanced.

DETAILED DESCRIPTION

Figure 1:
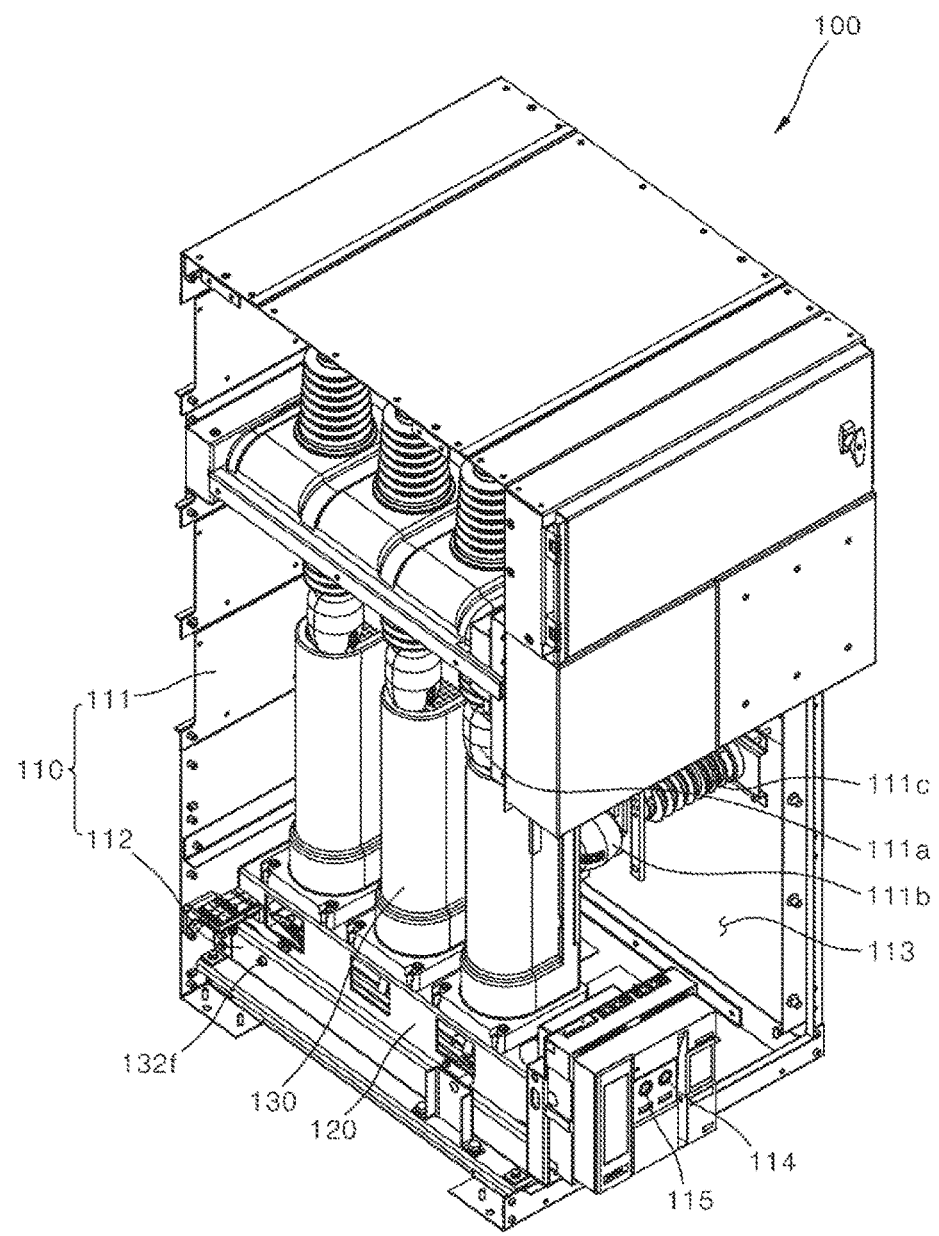
FIG. 1 is a perspective view schematically showing a circuit breaker including an insertion/withdrawal interlock device, and a switch board having the circuit breaker provided therein according to an embodiment of the present disclosure.

The above objects, features and advantages will become apparent from the detailed description with reference to the accompanying drawings. Embodiments are described in sufficient detail to enable those skilled in the art in the art to easily practice the technical idea of the present disclosure. Redundant description and detailed descriptions of well-known functions or configurations may be omitted in order not to unnecessarily obscure the gist of the present disclosure. Hereinafter, an interlock device for preventing insertion or withdrawal of a circuit breaker in a switch board according to preferred embodiments of the present disclosure will be described in detail with reference to the accompanying drawings. Throughout the drawings, like reference numerals refer to like elements. Embodiments of the disclosure are provided to more fully describe the present disclosure to those skilled in the art. It will be appreciated that for clarity of illustration, the shapes and dimensions of some of the elements can be exaggerated.

Figure 2:
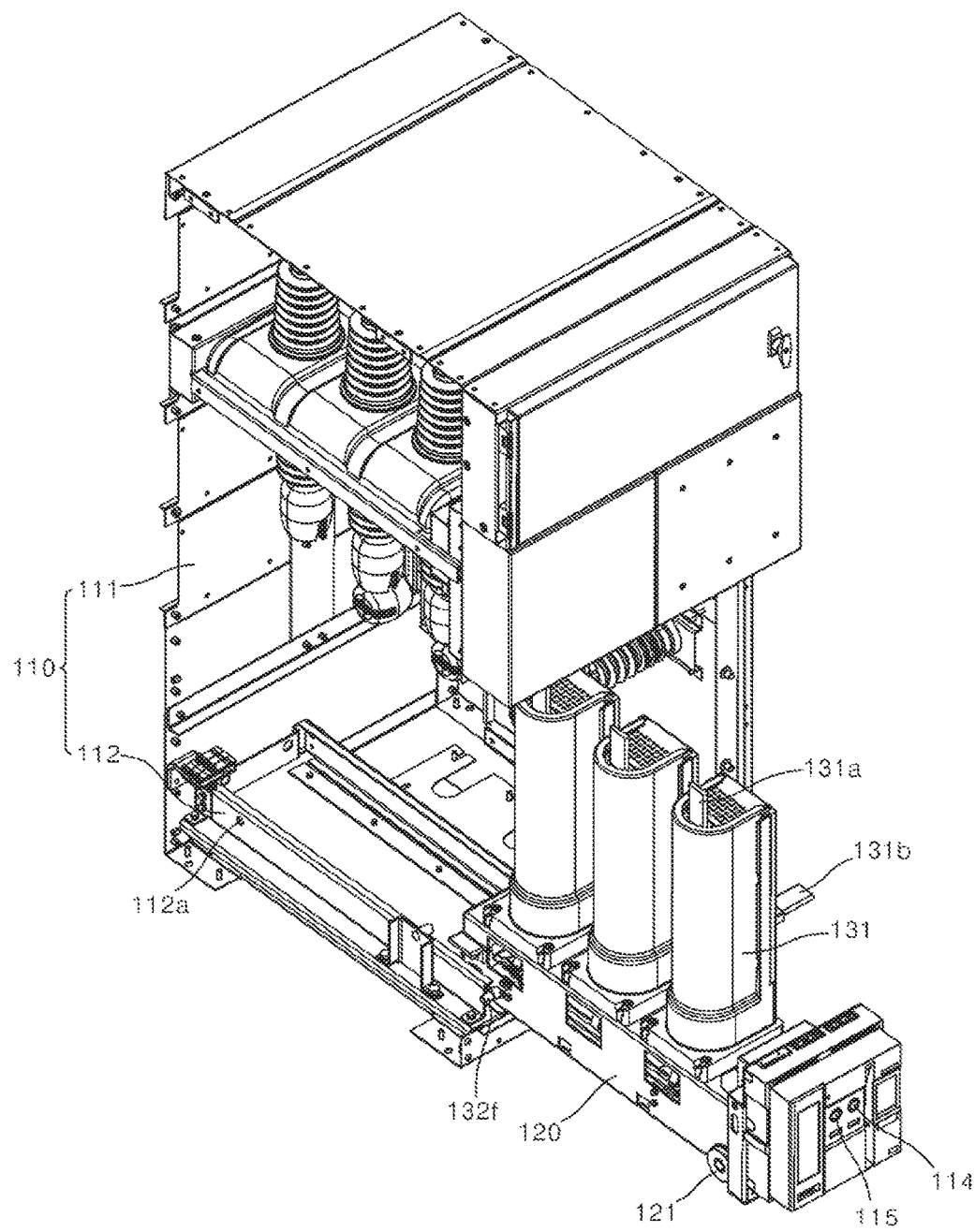
FIG. 2 is a view showing the circuit breaker withdrawn from the switch board in FIG. 1.

FIG. 1 is a perspective view schematically showing a circuit breaker including an is insertion/withdrawal interlock device, and a switch board having the circuit breaker provided therein according to an embodiment of the present disclosure. FIG. 2 is a view showing the circuit breaker withdrawn from the switch board in FIG. 1, and FIG. 3 is a perspective view showing the circuit breaker of FIG. 1.

Figure 3:
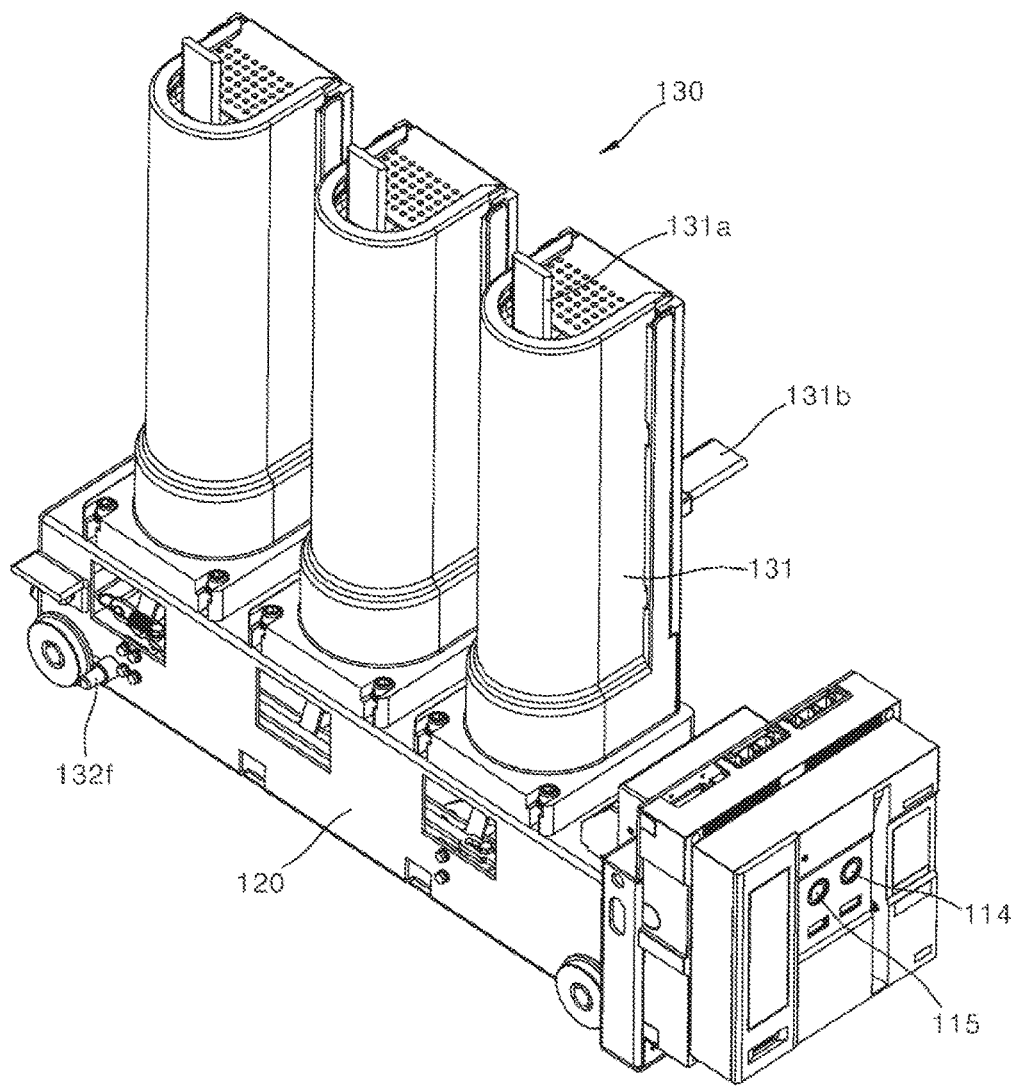
FIG. 3 is a perspective view showing the circuit breaker of FIG. 1.

As shown in FIG. 1 to 3, a switch board 100 includes a switch board body 110, a carriage 120, and a vacuum circuit breaker. Here, an insertion/withdrawal interlock device (indicated by 132 in FIG. 4) is coupled to the circuit breaker 130 and serves to fix the circuit breaker 130 to prevent insertion or withdrawal of the circuit breaker 130 put into the switch board body 110 to prevent an accident caused by incomplete contact between the power source of the switch board 100 and the terminal of the circuit breaker 130.

The switch board body 110, which is installed for operation or control of electric power, includes a housing 111 and a rail 112.

The housing 111 may be formed in the shape of a rectangular parallelepiped with an empty interior and has an entrance 113 formed on the rear side thereof. Specifically, a door (not shown) for opening and closing the interior of the housing 111 may be provided at the entrance 113 of the switch board body 110, and the interior of the housing 111 may be provided with a bus terminal 111a, a load terminal 111b, and a power plug 111c.

Accordingly, once the circuit breaker 130, which will be described later, is put in, power may be supplied to the circuit breaker 130 through the power plug 111c, and the circuit breaker 130 may perform an ON/OFF operation.

The rail 112 is installed on an inner lower portion of the housing 111, and has an interruption hole 112a formed on one side surface thereof. Here, the rail 112 may be arranged to extend from the entrance 113 formed at one end of the housing 111 to the other end.

The switch board body 110 may be provided with an ON button 114 and an OFF button 115 for putting in (ON) and tripping (OFF) the circuit breaker 130. The method of putting in (ON) and tripping off (OFF) the circuit breaker 130 in the switch board body 110 using the ON/OFF buttons 114 and 115 is already known and will not be described here.

The carriage 120 is provided with drive wheels 121 on both sides thereof and is thus movable back and forth along the rail 112 of the switch board body 110. Here, the front of the carriage 120 may be provided with a handle (not shown) for determining a movement direction.

The circuit breaker 130 includes a main body 131 and an insertion/withdrawal interlock device 132.

The main body 131 is installed on the carriage 120 and is inserted into or withdrawn from the switch board body 110. Here, the main body 131 may be provided with a bus terminal 131a and a load terminal 131b, which are connected to the bus terminal 111a and the load terminal 111b provided in the switch board body 110, respectively.

The insertion/withdrawal interlock device 132 is formed to protrude toward one side to set or release a pressed state. As the main body 131 is put in (ON) or tripped (OFF), the pressed state is released or set, and thus the insertion/withdrawal interlock device 132 is inserted into or removed from the interruption hole 112a.

Specifically, the insertion/withdrawal interlock device 132 may be mounted on one side of the carriage 120 or the main body 131 through a separate fastening member. When the pressed state is released, the insertion/withdrawal interlock device 132 protrudes toward one side and is inserted into the interruption hole 112a. When the insertion/withdrawal interlock device 132 is set in the pressed state, it is withdrawn from the interruption hole 112a and released from the inserted state.

Since the insertion/withdrawal interlock device 132 protrudes in one side direction of the carriage 120 or the main body 131, the circuit breaker 130 cannot be inserted into the switch board body 110 unless the insertion/withdrawal interlock device 132 is maintained in the pressed state. That is, as shown in FIG. 2, unless the pressed state is maintained, the insertion/withdrawal interlock device 132 abuts against the rail 112 and thus cannot be inserted into the switch board body 110.

Once the circuit breaker 130 is put into the switch board body 110 and the insertion/withdrawal interlock device 132 is inserted into the interruption hole 112a as shown in FIG. 1, insertion/withdrawal of the circuit breaker 130 is not allowed any more in the switch board body 110, and therefore an accident caused by incomplete contact may be prevented.

The insertion/withdrawal interlock device 132 is connected to the OFF button 115. When the insertion/withdrawal interlock device 132 is inserted into or released from the interruption hole 112a, the OFF button 115 may release or maintain the pressed state.

Since the OFF button 115 releases the pressed state only when the insertion/withdrawal interlock device 132 releases the pressed state and is inserted into the interruption hole 112a, safety may be enhanced when the circuit breaker 130 is put in (ON).

While the circuit breaker 130 is inserted into the switch board body 110 along the rail 112, the insertion/withdrawal interlock device 132 is persistently maintained in the pressed state by the rail 112. Accordingly, even if the ON button 114 is inadvertently pressed, the circuit breaker 130 is kept in the OFF state, and power cannot be applied to the circuit breaker 130.

Figure 4:
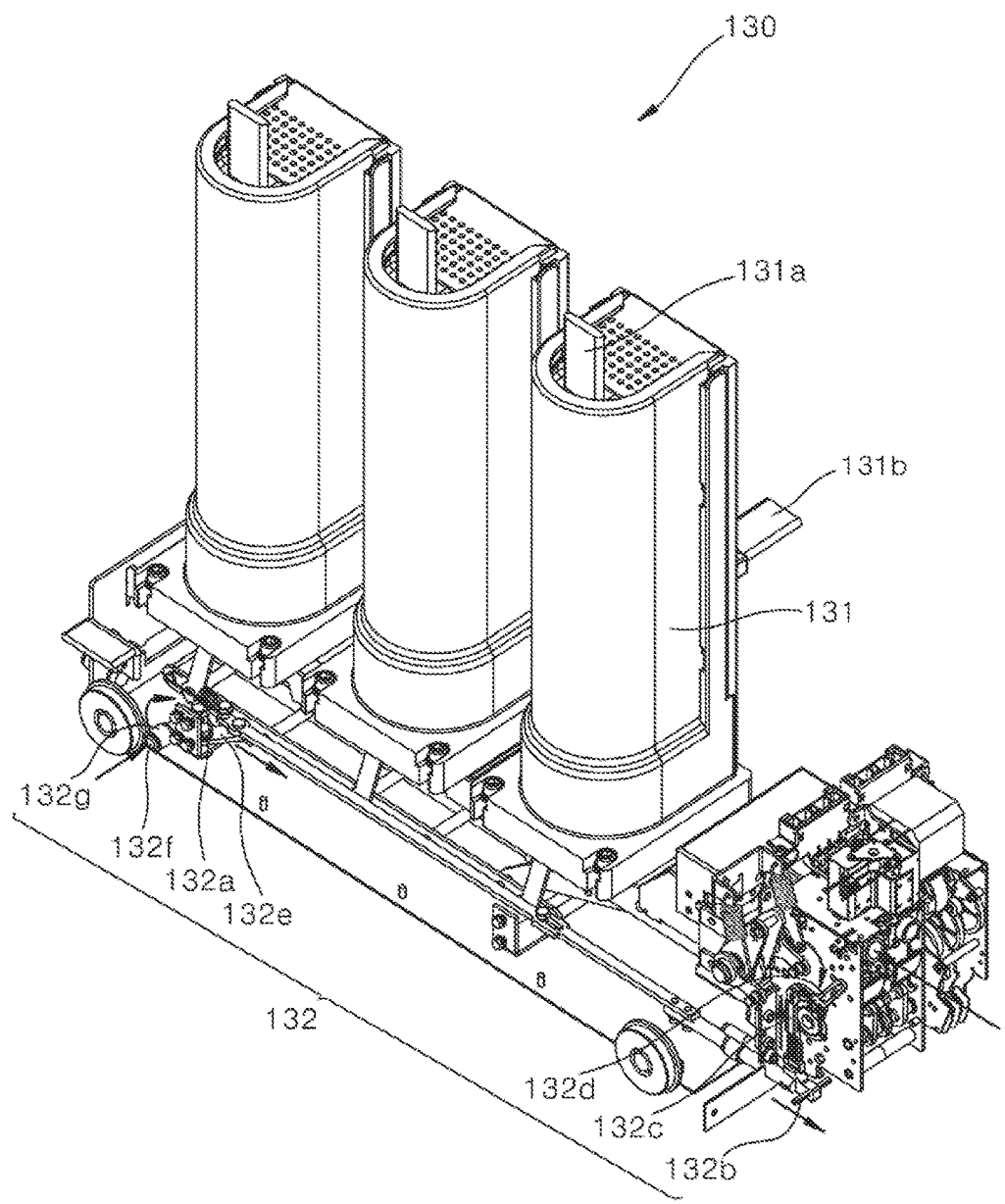
FIG. 4 is an internal perspective view showing the circuit breaker of FIG. 1.
Figure 5:
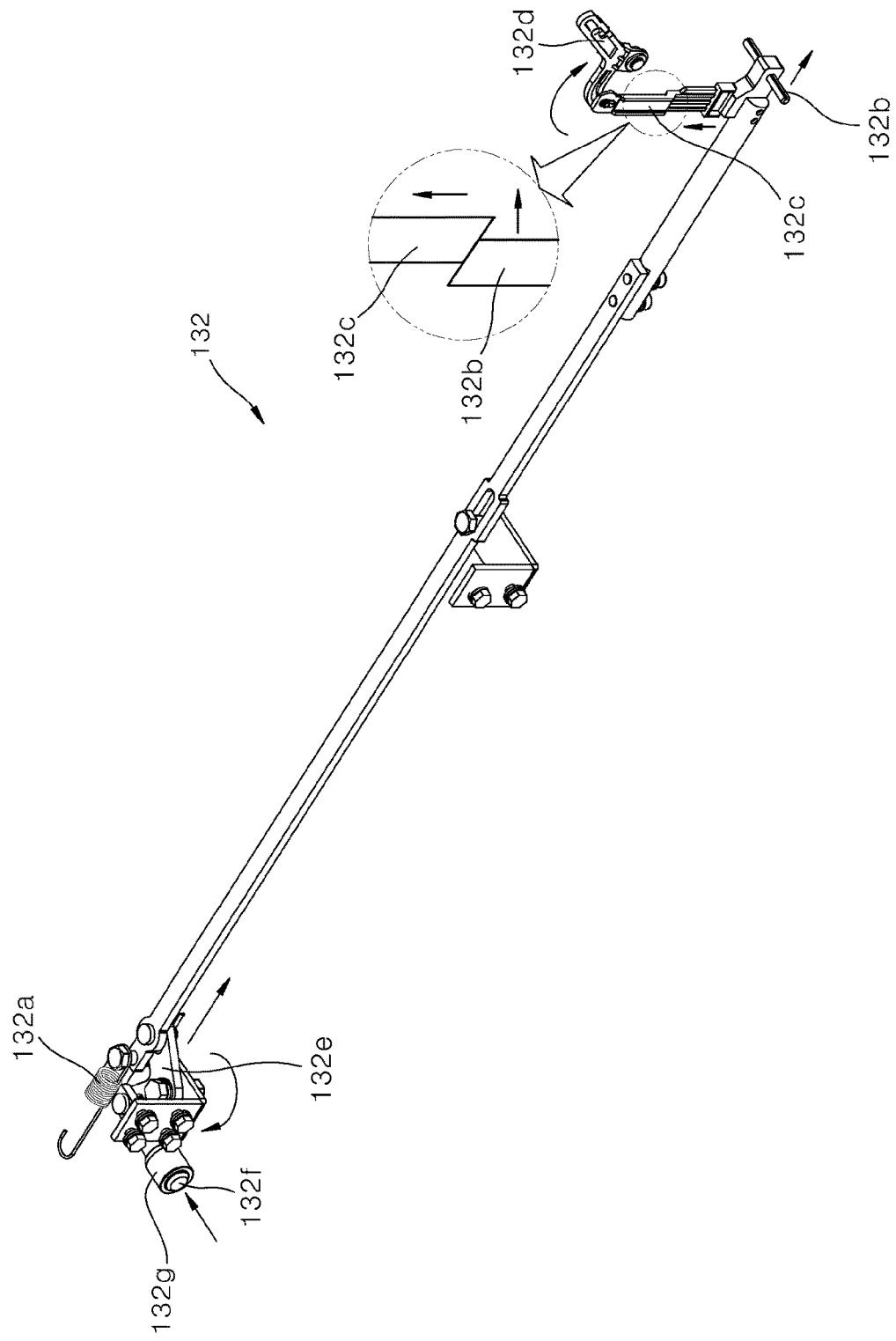
FIG. 5 is a view showing an insertion/withdrawal interlock device of FIG. 4.

FIG. 4 is an internal perspective view showing the circuit breaker of FIG. 1, and FIG. 5 is a view showing an insertion/withdrawal interlock device of FIG. 4.

As shown in FIGS. 4 and 5, the insertion/withdrawal interlock device 132 includes an elastic member 132a, an interlock lever 132b, a latch 132c, an L lever 132d, a link member 132e, and an interlock rod 132f.

The elastic member 132a is installed on one side of the circuit breaker 130. Specifically, the elastic member 132a is horizontally arranged to stretch back and forth, and provides an elastic force for moving and returning the interlock lever 132b, which will be described later.

The interlock lever 132b is connected to the elastic member 132a at one end thereof and is movable back and forth. The other end of the interlock lever 132b may be provided with an inclined surface inclined up forward.

The latch 132c is positioned such that one end thereof corresponds to the other end of the interlock lever 132b, and vertically moves as the interlock lever 132b moves back and forth. The latch 132c is disposed perpendicularly with respect to the interlock lever 132b and is positioned such that one end of the latch 132c contacts the interlock lever 132b. The latch 132c is operatively connected with the back and forth movement of the interlock lever 132b, and is thus allowed to vertically move along the inclined surface of the interlock lever 132b.

One end of the L lever 132d is connected to the other end of the latch 132c and the is other end of the L lever 132d is connected to one end of the OFF button. The L lever 132d rotates forward and backward in operative connection with the vertical movement of the latch 132c, and moves the button 115 back and forth.

One end of the link member 132e is connected to the other end of the interlock lever 132b, and rotates in operative connection with the back and forth movement of the interlock lever 132b. Here, the link member 132e is pivotably disposed on the lower side of the interlock lever 132b so as to intersect with the interlock lever 132b.

One end of the interlock rod 132f is connected to the other end of the link member 132e and moves to the left and right sides in operative connection with rotation of the link member 132e to be inserted into or removed from the interruption hole 112a of the switch board body 110. Here, the interlock rod 132f may be installed in the bush 132g, and may be inserted or removed while staying in the bush 132g.

The link member 132e serves to connect the interlock lever 132f to the interlock lever 132b and to transmit force in an orthogonal direction. The link member 132e may be integrally formed at an end of the interlock rod 132f or the interlock lever 132b, and may be implemented in a hinged manner. In order to insert the circuit breaker 130 into the switch board body 110 up to a position where the circuit breaker 130 is placed, the interlock rod 132f and the interruption hole 112a are preferably arranged at the same distance from one end of the housing 111.

Since the insertion/withdrawal interlock device 132 is configured as described above, the OFF button 115 and the interlock rod 132f can be held in the pressed state, and the circuit breaker 130 can be inserted into the switch board body 110 only when the user pulls the latch 132c in the withdrawing direction. When the user releases the latch 132c, the OFF button 115 and the interlock rod 132f are released from the pressed state by the restoring force of the elastic member 132a.

Since the interlock device 132 for preventing insertion or withdrawal of the circuit breaker 130 into or from the switch board body 110 is provided to the circuit breaker 130 and is inserted into the interruption hole 112a in the switch board body 110 as described above, the circuit breaker 130 cannot be removed from the switch board body 110 while power is applied. Accordingly, an accident caused by incomplete contact may be prevented, and the circuit breaker 130 may be prevented from being broken due to electrical damages.

In addition, when the circuit breaker 130 is inserted into the switch board body 110 along the rail 112, the insertion/withdrawal interlock device 132 is kept pressed by the rails 112, and accordingly the OFF button 115 connected to the insertion/withdrawal interlock device 132 is also held in the pressed state. Accordingly, even if the ON button for putting in the circuit breaker is inadvertently pressed, the circuit breaker 130 is kept in the OFF state, and therefore stability may be enhanced.

While the present disclosure has been particularly shown and described with reference to exemplary embodiments thereof in the accompanying drawings, it is clearly understood that the same is by way of illustration and example only and is not to be taken by way of limitation and that the present disclosure described above may be variously substituted, altered, and modified by those skilled in the art to which the present invention pertains without departing from the scope and sprit of the present disclosure. Therefore, the true scope of protection of the present disclosure should be determined only by the appended claims.

What is claimed is:

1. An interlock device for preventing insertion or withdrawal of a circuit breaker into or from a switch board having an ON button and an OFF button and including a switch board body provided with a housing and a rail having an interruption hole formed on one side surface thereof, a carriage movable back and forth along the rail of the switch board body, and the circuit breaker including a main body installed on the carriage and inserted into or withdrawn from the switch board body, the interlock device comprising:
    an interlock rod protruding toward one side to set or release a pressed state, wherein the interlock rod is set in or released from the pressed state and inserted into or disengaged from the interruption hole when the main body is inserted or tripped;
    an elastic member provided on one side of the circuit breaker;
    an interlock lever connected to one end of the elastic member and movable back and forth;
    a latch positioned such that a first end of the latch contacts the other end of the interlock lever, wherein the latch moves vertically in operative connection with a back and forth movement of the interlock lever;
    an L lever having a first end connected to a second end of the latch and a second end connected to one end of the OFF button, wherein the L lever rotates in operative connection with vertical movement of the latch to move the OFF button back and forth; and
    a link member having one end connected to the other end of the interlock lever and rotating in operative connection with the back and forth movement of the interlock lever,
    wherein one end of the interlock rod is connected to the other end of the link member and moves in left and right directions in operative connection with a rotation of the link member to be inserted into or removed from the interruption hole of the switch board body.

2. The interlock device according to claim 1, wherein the OFF button releases or maintains the pressed state as the interlock rod is inserted into or removed from the interruption hole.

3. The interlock device according to claim 1, wherein the other end of the interlock lever is provided with an inclined surface inclined up forward.

4. The interlock device according to claim 1, wherein the interlock rod and the interruption hole are disposed at the same distance from one end of the housing.

* * * * *